(12) United States Patent
Sim et al.

(10) Patent No.: US 8,760,834 B2
(45) Date of Patent: *Jun. 24, 2014

(54) FAULT CURRENT LIMITER

(75) Inventors: Jung Wook Sim, Cheongju-si (KR);
Won Joon Choe, Cheongju-si (KR);
Gyeong Ho Lee, Cheongju-si (KR);
Seung Hyun Bang, Busan (KR); Min Jee Kim, Cheongju-si (KR); Hae Yong Park, Masan-si (KR)

(73) Assignee: LSIS Co., Ltd., Anyang-si, Gyeonggi-do (KR)

( * ) Notice: Subject to any disclaimer, the term of this patent is extended or adjusted under 35 U.S.C. 154(b) by 20 days.

This patent is subject to a terminal disclaimer.

(21) Appl. No.: 13/543,734

(22) Filed: Jul. 6, 2012

(65) Prior Publication Data

US 2013/0021705 A1    Jan. 24, 2013

(30) Foreign Application Priority Data

Jul. 22, 2011   (KR) .................. 10-2011-0073236

(51) Int. Cl.
*H02H 9/08* (2006.01)

(52) U.S. Cl.
USPC ........................... 361/93.9; 361/13

(58) Field of Classification Search
USPC .................................. 361/19, 93.9
See application file for complete search history.

(56) References Cited

U.S. PATENT DOCUMENTS

| 5,650,901 | A * | 7/1997 | Yamamoto ................. 361/8 |
| 5,883,774 | A | 3/1999 | Kida et al. |
| 6,608,470 | B1 * | 8/2003 | Oglesbee et al. ............ 320/136 |
| 8,335,060 | B2 * | 12/2012 | Bang et al. ................. 361/2 |
| 2002/0116092 | A1 * | 8/2002 | Hamamatsu et al. ......... 700/295 |
| 2002/0158633 | A1 * | 10/2002 | Baumgaertl et al. ......... 324/424 |
| 2009/0147412 | A1 * | 6/2009 | Kojovic et al. .............. 361/36 |
| 2012/0299393 | A1 * | 11/2012 | Hafner et al. .............. 307/113 |
| 2013/0021706 | A1 * | 1/2013 | Sim et al. ................. 361/93.9 |

FOREIGN PATENT DOCUMENTS

| EP | 0474611 | 3/1992 |
| EP | 2028741 | 2/2009 |
| JP | 2000133099 | 5/2000 |
| JP | 2004266978 | 9/2004 |
| JP | 2009050140 | 3/2009 |
| KR | 10-1044492 | 6/2011 |
| WO | 2011/057675 | 5/2011 |

OTHER PUBLICATIONS

Korean Intellectual Property Office Application Serial No. 10-2011-0073236, Office Action dated Jul. 16, 2012, 4 pages.
European Patent Office Application Serial No. 12173736.5, Search Report dated Sep. 27, 2013, 11 pages.
Japan Patent Office Application Serial No. 2012-161682, Office Action dated Sep. 17, 2013, 3 pages.

* cited by examiner

*Primary Examiner* — Rexford Barnie
*Assistant Examiner* — Angela Brooks
(74) *Attorney, Agent, or Firm* — Lee, Hong, Degerman, Kang & Waimey

(57) ABSTRACT

Provided is a fault current limiter, the limiter including a detector detecting an inflow of a fault current and transmitting a turn-off signal to a power semiconductor element; the power semiconductor element changed to an OFF state by the turn-off signal; and a resistance element connected in parallel to the power semiconductor element to block the fault current.

5 Claims, 8 Drawing Sheets

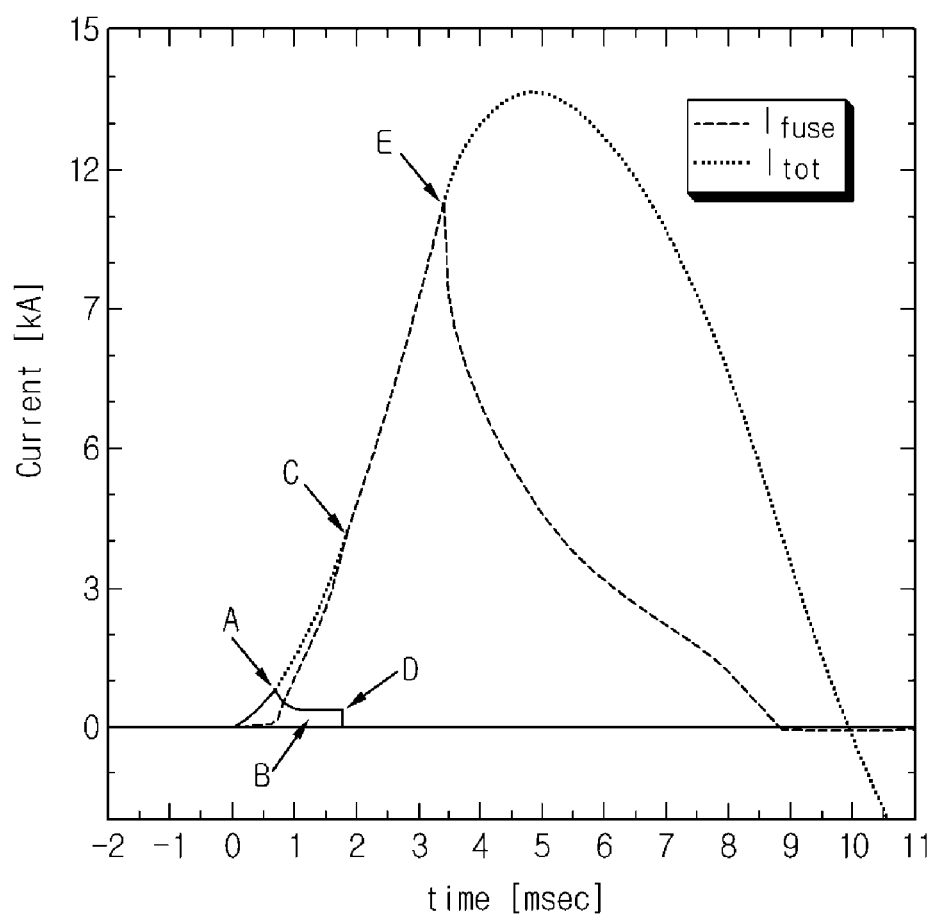

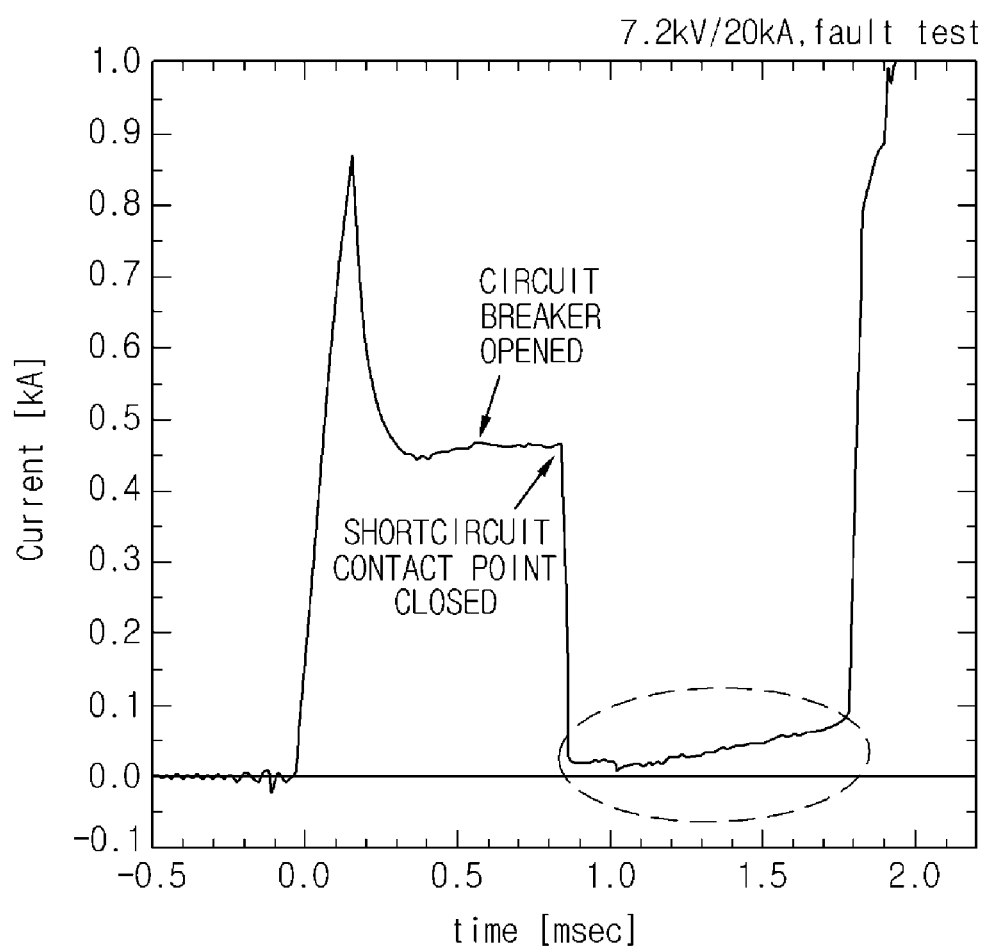

FAULT CURRENT LIMITER

Pursuant to 35 U.S.C. §119 (a), this application claims the benefit of earlier filing date and right of priority to Korean Patent Application No. 10-2011-0073236, filed on Jul. 22, 2011, the contents of which is hereby incorporated by reference in their entirety.

BACKGROUND OF THE DISCLOSURE

1. Field of Endeavor

The present disclosure relates to a fault current limiter, and more particularly to a fault current limiter used in electrical distribution or transmission networks

2. Background

A fault current limiter is a means of detecting a fault current and limiting the current to a normal level within several seconds, using a superconductor as a current limiting device which has substantially no resistance until certain up to a predetermined current value but rapidly represents a high resistance over a predetermined current value to limit the conducting current.

The fault current limiter is concentrated with a huge amount of energy due to resistance generated by the superconductor, such that energy consumption of the superconductor increases as the voltage applied to the superconductor increases.

That is, a superconductor exhibits zero resistance during its normal operation state in a system, however, when a fault current flows in the system, the superconductor is quenched to produce resistance which limits the fault current.

At this time, the resistance may cause considerable energy to be applied to the current limiter. As a voltage applied to the system that runs the superconductor is high, the energy flowing in the superconductor correspondingly increases due to the impedance produced at the superconductor. Accordingly, lots of superconductors are needed to distribute the energy.

Thus, to minimize the energy consumption of the superconductor, a large number of the superconductors is needed which leads to increasing the manufacturing cost, and a total volume increases in accordance with use of huge number of superconductors, thereby increasing the installation and cooling cost.

That is, the superconductor is expensive in price and lots of superconductors mean large volume, which may increase the costs for installing and cooling the superconductor. To overcome the above problems, a hybrid-type superconducting fault current limiter (SFCL) including an existing circuit breaking means and a small number of superconductors has been disclosed. But the suggestion has failed to solve the price problem. As capacity of the resistive superconducting fault current limiter becomes large, size of the linear coils and number of windings have to be increased thereby to have a disadvantage in cost and operation.

FIG. 1 is a circuit diagram illustrating a structure of a hybrid-type superconducting fault current limiter according to prior art, FIG. 2a is a current graph of the hybrid-type superconducting fault current limiter of FIG. 1, FIG. 2b is a graph illustrating a start point of the hybrid-type superconducting fault current limiter of FIG. 1, FIG. 2c is a graph illustrating an arc current in the hybrid-type superconducting fault current limiter of FIG. 1, and FIG. 2d is a current graph of the hybrid-type superconducting fault current limiter where electric arc was not blocked by the main circuit of the fault current limiter.

Referring to FIGS. 1 and 2, an electric current $I_{tot}$ passes through the closed circuit breaker 210 and superconductor 100 during a normal operation state without any fault ($I_{main}$), so that loss caused by occurrence of resistance is substantially zero. However, in a case where a fault current ($I_{fuse}$) flows into the fault current limiter, the superconductor 100 starts to be quenched (A) at a very high speed, and the fault current ($I_{fuse}$) due to impedance developed at the superconductor 100 bypasses the fault current to the driving coil 220.

At this time, a magnetic field is generated by the current flowing into the driving coil 220, and an eddy current having a diamagnetic component is induced at an electromagnetic repeller 230 located over the driving coil 220.

Accordingly, the repeller 230 moves fast and opens a circuit breaker 210 that is mechanically linked with the repeller 230 thereby to cut off the inflow of the fault current into the superconductor 100 (B).

However, in the fault current limiter thus configured, at the minute that the circuit breaker 210 is open, an arc current occurs across the circuit breaker 210, which causes the fault current to continue to flow into the superconductor 100. To eliminate the arc current, the fault current limiter is designed to close a short contact 240 that is mechanically linked with the electromagnetic repeller 230 (C). The short contact 240 serves to remove the arc current occurring across the circuit breaker 210 connected in series with the superconductor 100, and protect the driving coil 220 from inflow of the fault current. That is, the whole fault current is transferred through the short contacts 240 to an auxiliary circuit, and therefore, the arc current across the circuit breaker 210 is eliminated (D) and then the fault current is transferred to the auxiliary circuit and reduced by the current limiting unit 300 (E).

However, in the course of limiting the fault current thus explained, the electric arc occurring across the circuit breaker 210 that is connected in series with the superconductor 100 may not be sufficiently removed before the current limiting unit 300 starts to operate due to difference in impedance between a main circuit including the superconductor 100 and the high-speed switch and the auxiliary circuit including the current limiting unit 300 that functions to limit the current (F).

Accordingly, an arc current is reproduced across the circuit breaker 210 due to the difference in impedance between the main circuit and the auxiliary circuit (G), which can reduce the arc impedance, so that the fault current can go through the superconductor 100 that changed into a normal conductive state and the circuit breaker 210 that becomes conductive due to the electric arc. At this time, most of voltage is applied to the superconductor 100 that is in a normal conductive state, so that the fault energy may flow into the superconductor 100, thereby damaging the superconductor 100.

FIG. 3 is a circuit diagram illustrating a hybrid-type superconducting fault current limiter according to prior art, proposed to solve the aforementioned problems, wherein a power semiconductor element 400 is added thereto. The power semiconductor element is added to the main circuit to block an arc current generated after the superconductor 100 is quenched.

However, the fault current limiter according to FIG. 3 also fails to solve the problems because superconductors are employed and the number of superconductors must be adjusted to adjust the operating current to thereby increase the costs for installing and cooling the superconductor and to reduce convenience in manipulation.

SUMMARY OF THE DISCLOSURE

The present disclosure has been made to solve the foregoing problem(s) of the prior art, and therefore an object of certain embodiments of the present invention is to provide a fault current limiter configured to easily remove a fault current present therein.

In one general aspect of the present disclosure, there is provided a fault current limiter, the current limiter comprising: a detector detecting an inflow of a fault current and transmitting a turn-off signal to a power semiconductor element; the power semiconductor element changed to an OFF state by the turn-off signal; and a resistance element connected in parallel to the power semiconductor element to block the fault current.

Preferably, but not necessarily, the fault current limiter further comprises a switch element connected to the power semiconductor element in series to open a contact point in a case where the fault current is introduced, and to protect the power semiconductor element against the fault current.

Preferably, but not necessarily, the serial connection between the switch element and the power semiconductor element is connected in parallel with the resistance element.

Preferably, but not necessarily, the detector transmits an open signal to the switch element in a case where the fault current is introduced, and the switch element is opened by the open signal.

Preferably, but not necessarily, the fault current limiter further comprises a measurement unit measuring an inflow current, and the detector detects an inflow of fault current from a current measured by the measurement unit.

Preferably, but not necessarily, the measurement unit includes a current transformer and a Rogowski coil.

Preferably, but not necessarily, the fault current limiter further comprises a first power fuse connected to the resistance element in parallel to temporarily cut off the fault current introduced during occurrence of fault current.

Preferably, but not necessarily, the fault current limiter further comprises a second power fuse connected to the resistance element in series to cut off a fault current passing the resistance element.

Preferably, but not necessarily, the detector transmits the open signal prior to the turn-off signal, in a case where a fault current is introduced.

Preferably, but not necessarily, the power semiconductor element is selected from any one of a group consisting of an insulated gate bipolar transistor (IGBT), a gate turn-off thyristor (GTO), and an integrated gate commutated thyristor (IGCT).

The fault current limiter according to the present disclosure has an advantageous effect in that the fault current limiter is configured by removing superconductors and employing a power semiconductor switch element, whereby it is easy to control the fault current limiter and reliable fault current detection is enabled using a high speed fault detector.

The fault current limiter according to the present disclosure has another advantageous effect in that a power fuse is used to initially limit a fault current, and the fault current is secondly limited using a resistor, whereby the fault current can be limited more perfectly.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIG. 2b is a graph illustrating a start point of the hybrid-type superconducting fault current limiter of FIG. 1;

FIG. 2d is a current graph of the hybrid-type superconducting fault current limiter where electric arc was not blocked by the main circuit of the fault current limiter;

DETAILED DESCRIPTION

Figure 1:
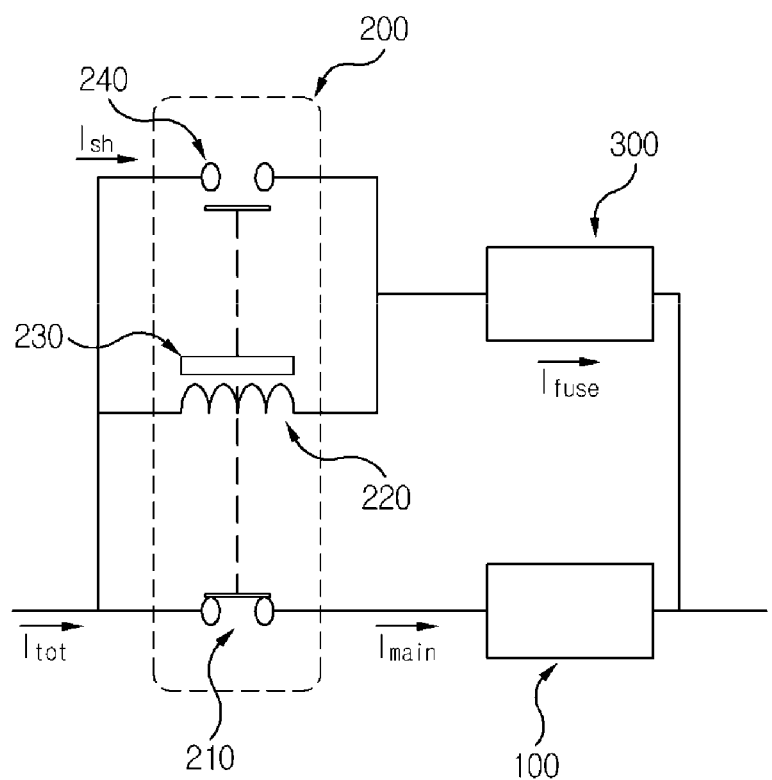
FIG. 1 is a circuit diagram illustrating a structure of a hybrid-type superconducting fault current limiter according to prior art.
Figure 2A:
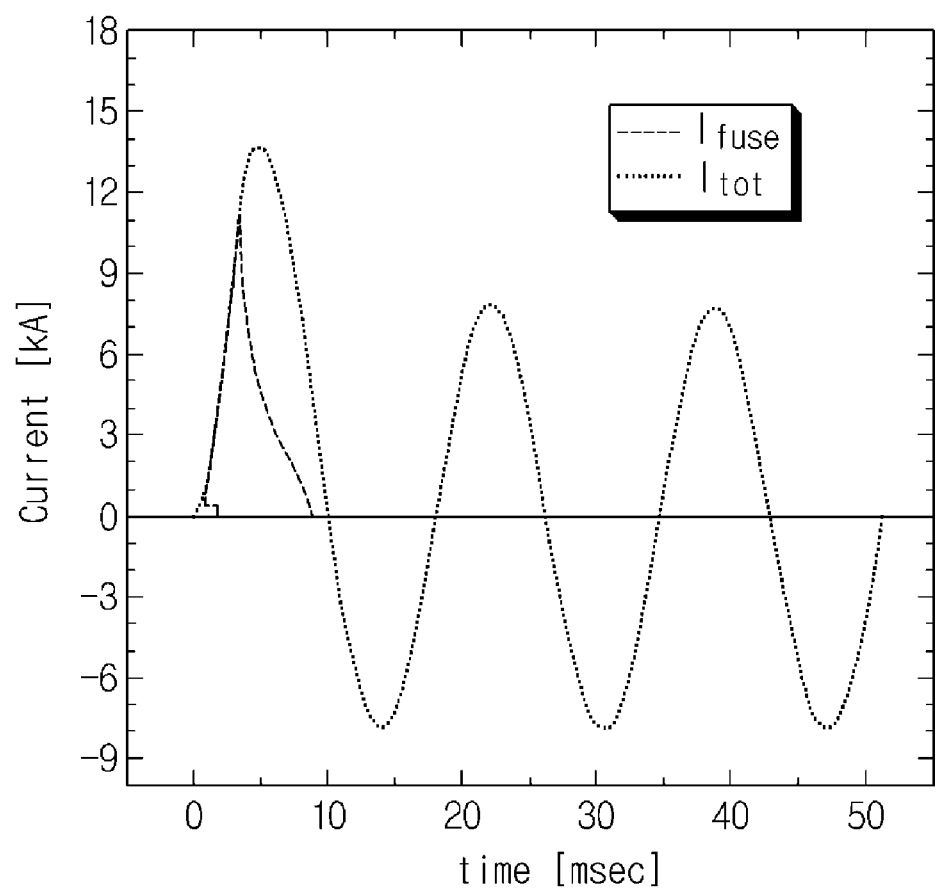
FIG. 2a is a current graph of the hybrid-type superconducting fault current limiter of FIG. 1.
Figure 2C:
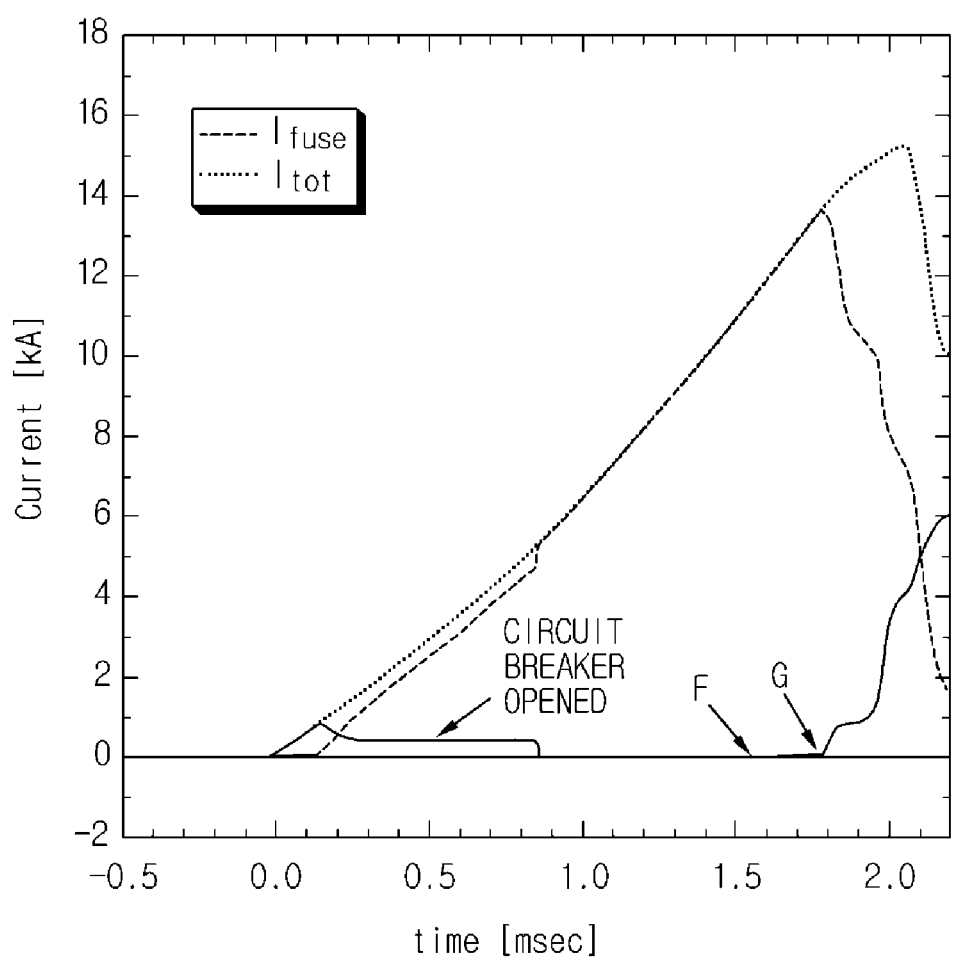
FIG. 2c is a graph illustrating an arc current in the hybrid-type superconducting fault current limiter of FIG. 1.
Figure 3:
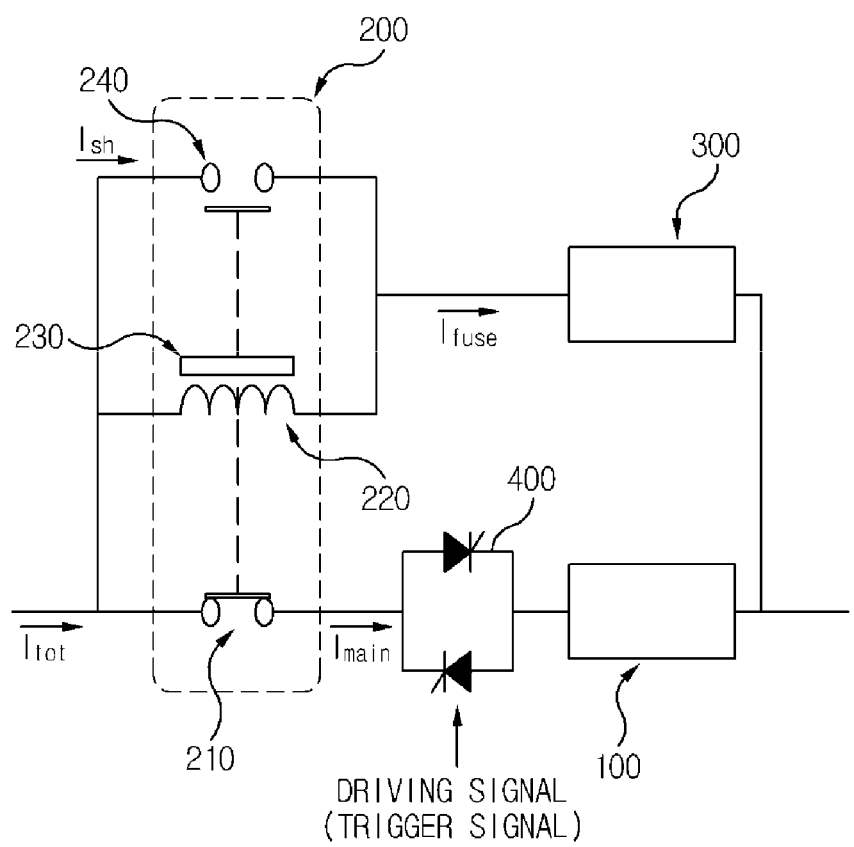
FIG. 3 is a circuit diagram illustrating a hybrid-type superconducting fault current limiter according to prior art.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a fault current limiter according to the present disclosure will be described in detail with reference to the accompanying drawings.

Figure 4:
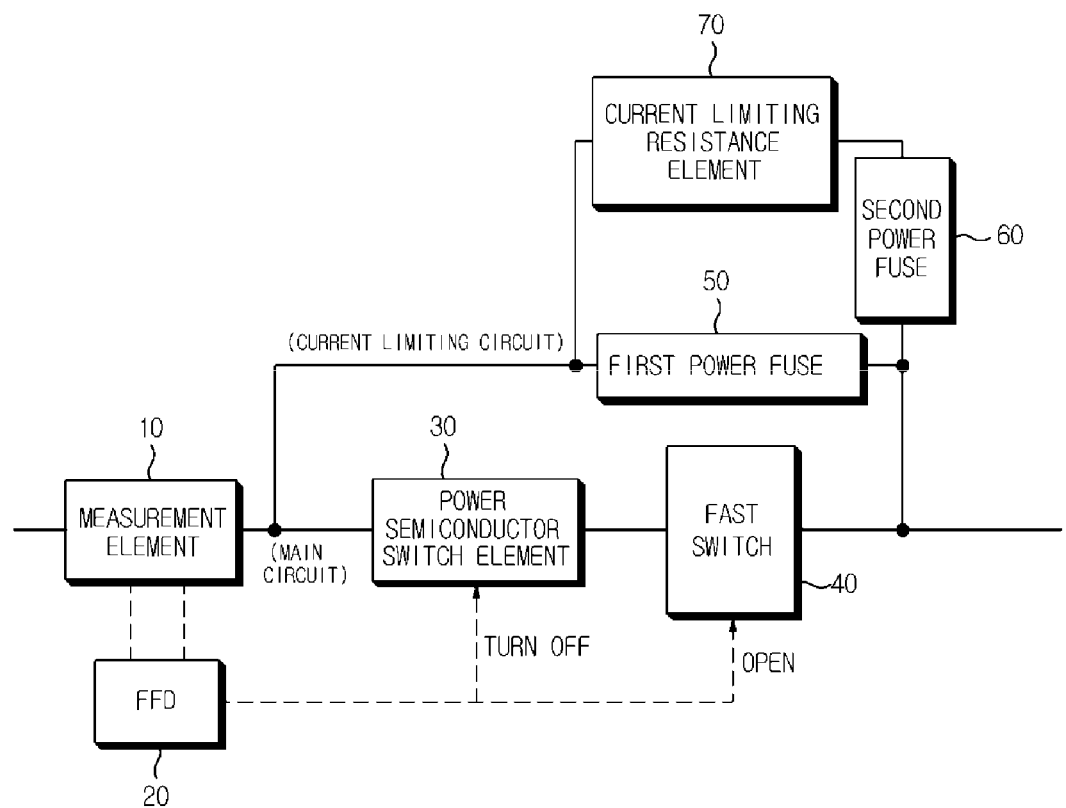
FIG. 4 is a block diagram illustrating a fault current limiter according to the present disclosure.

FIG. 4 is a block diagram illustrating a fault current limiter according to the present disclosure.

Referring to FIG. 4, a fault current limiter according to the present disclosure comprises a measurement unit (10), an FFD (Fast Failure Detector, 20), a power semiconductor element (30), a fast switch (40), first and second power fuses (50 and 60) and a current limiting resistance element (70).

The power semiconductor element (30) and the fast switch (40) are connected in series to form a main circuit. The first power fuse (50) is connected in parallel to a serial connection between the power semiconductor element (30) and the fast switch (40), where the serial connection between the current limiting resistance element (70) and the second power fuse (60) is connected to the first power fuse (50) in parallel. These two parallel connection forms the current limiting circuit.

The measurement unit (10) measures a current and current accruement. The measurement unit (10) preferably includes a CT (Current Transformer and a Rogowski coil. The CT and the Rogowski coil are well known in the art such that no more explanation thereto will be provided herein and omitted.

In a case where the measurement unit (10) measures a current accruement to detect a failure, that is, in a case where a fault current is generated, the FFD (20) transmits an open signal opening the fast switch (40) to the fast switch (40) and transmits a turn-off signal turning off the power semiconductor element (30) to the power semiconductor element (30), details of which will be described later.

The power semiconductor element (30) maintains an ON state in normal times, but receives the turn-off signal from the FFD 20 to be switched to a turn-off state, in a case where the fault current is introduced. The power semiconductor element (30) may be selected from any one of an insulated gate bipolar transistor (IGBT), a gate turn-off thyristor (GTO), and an integrated gate commutated thyristor (IGCT), but it is not limited thereto.

The fast switch (40) formed to maintain insulation at a fast speed protects the power semiconductor element (30). The fast switch (40) receives an open signal from the FFD (20) to open a main circuit at a fast speed, in a case where the fault current is introduced.

The first power fuse (50) connected in parallel with the current limiting resistance element 70 is formed to initially cut off the fault current introduced into the current limiting circuit, and bypasses the fault current to the current limiting resistance element 70.

The first power fuse (50) may be designed to cut off a large fault current. The first power fuse (50) initially cuts off the fault current introduced into the current limiting circuit, where the moment the first power fuse (50) is fused, the fault current is detoured to the current limiting resistance element (70).

The second power fuse (60) connected in series to the current limiting resistance element (70) also cuts off the fault current introduced into the current limiting circuit and cuts off the fault current passing the current limiting resistance element (70). The second power fuse (60) may be designed to cut off a small fault current over the first power fuse (50). The fault current introduced into the second power fuse (60) is a residual current after the first power fuse (50) is fused and the current limiting resistance element (70) is heated.

Although the first and second power fuses (50 and 60) are elements having the same function, the first power fuse (50) functions to bypass the fault current to the current limiting resistance element (70), while the second power fuse (60) functions to completely cut off the fault current. The physical structure of the power fuses is well known in the art, such that no further explanation will be given thereto.

The current limiting resistance element (70) is a resistor limiting the introduced fault current to cut off the fault current in association with the second power fuse (60). The impedance of the current limiting resistance element (70) is determined in consideration of cooperative operation with the second power fuse (60).

Figure 5:
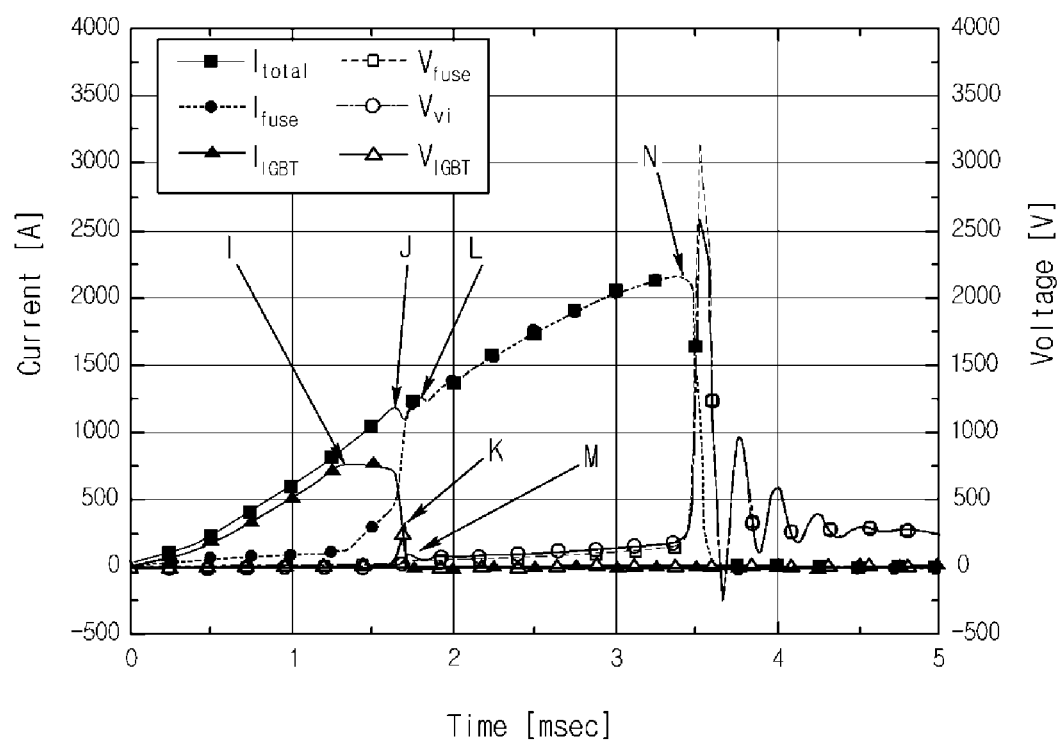
FIG. 5 is a schematic view illustrating a current flowing in the fault current limiter of FIG. 4.

Now, a detailed operation of the fault current limiter according to the present disclosure will be described with reference to the accompanying drawing. FIG. 5 is a schematic view illustrating a current flowing in the fault current limiter of FIG. 4.

First, all the currents pass the main circuit including the power semiconductor element (30) and the fast switch (40) in normal times, but some of the currents may flow to the fault current limiter. The measurement unit (10) serves to continuously measure a current.

In a case where the measurement unit (10) detects occurrence of fault current, the FFD (20) detects the fault at a fast speed based thereon, transmits an open signal initially opening a contact point of the fast switch (40), and the fast switch (40) is opened. 'I' of FIG. 5 illustrates a moment when the fast switch (40) is opened. The moment the contact point of the fast switch (40) is opened, an arc current flows across the contact point to increase the fault current toward the current limiting circuit in response to the arc impedance, whereby the fault current at the main circuit is slowed or weakened in its uptrend.

Furthermore, the FFD (20) transmits a turn-off signal turning off the power semiconductor element (30) whereby the power semiconductor element (30) is turned off, in the course of opening the fast switch (40) to widen a gap between the contact points in the fast switch (40).

'J' of FIG. 5 illustrates a moment when the power semiconductor element (30) is turned off. At this time, the main circuit is cut off to quench the arc current of the fast switch ('M'). The moment the power semiconductor element (30) is turned off, a voltage is generated across the power semiconductor element (30), which is illustrated by 'K' in FIG. 5, and the moment the power semiconductor element (30) is turned off, the fault current is completely diverted to the fault current limiter, which is illustrated by 'L'.

Subsequently, the fault current flows to the current limiting circuit, and after a predetermined period of time, the first power fuse (50) is fused ('N'). At the same time the first power fuse (50) is fused, the fault current flows to the current limiting resistance element (70), whereby it can be noted that the fault current is limited in response to the impedance of the current limiting resistance element (70).

As apparent from the foregoing, the fault current limiter is excellent in limiting effect of fault current and easy in control by adopting only the power semiconductor element (30) instead of superconductors.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A fault current limiter, the limiter comprising:
a detector configured to detect an inflow of a fault current, and transmit a turn-off signal to a power semiconductor element and an open signal to a switch in a case where the fault current is introduced;
the power semiconductor element changed to an OFF state by the turn-off signal;
the switch connected to the power semiconductor element in series and configured to pen a contact point by the open signal, and protect the power semiconductor element against the fault current;
a first power fuse connected in parallel to a first serial connection of the power semiconductor element and the switch and configured to temporarily cut off the fault current introduced during occurrence of fault current;
a resistance element configured to block the fault current; and
second power fuse connected to the resistance element in series to cut off a fault current passing the resistance element, wherein a second serial connection of the resistance element and the second power fuse is connected to the first power fuse in parallel.

2. The fault current limiter of claim 1, further comprising:
a measurement unit configured to measure an inflow current, wherein the detector is configured to detect an inflow of fault current from a current measured by the measurement unit.

3. The fault current limiter of claim 2, wherein the measurement unit includes a current transformer and a Rogowski coil.

4. The fault current limiter of claim 1, wherein the detector transmits the open signal prior to the turn-off signal, in a case where a fault current is introduced.

5. The fault current limiter of claim 1, wherein the power semiconductor element is selected from any one of an insulated gate bipolar transistor (IGBT), a gate turn-off thyristor (GTO), and an integrated gate commutated thyristor (IGCT).

* * * * *